Patented Mar. 1, 1932

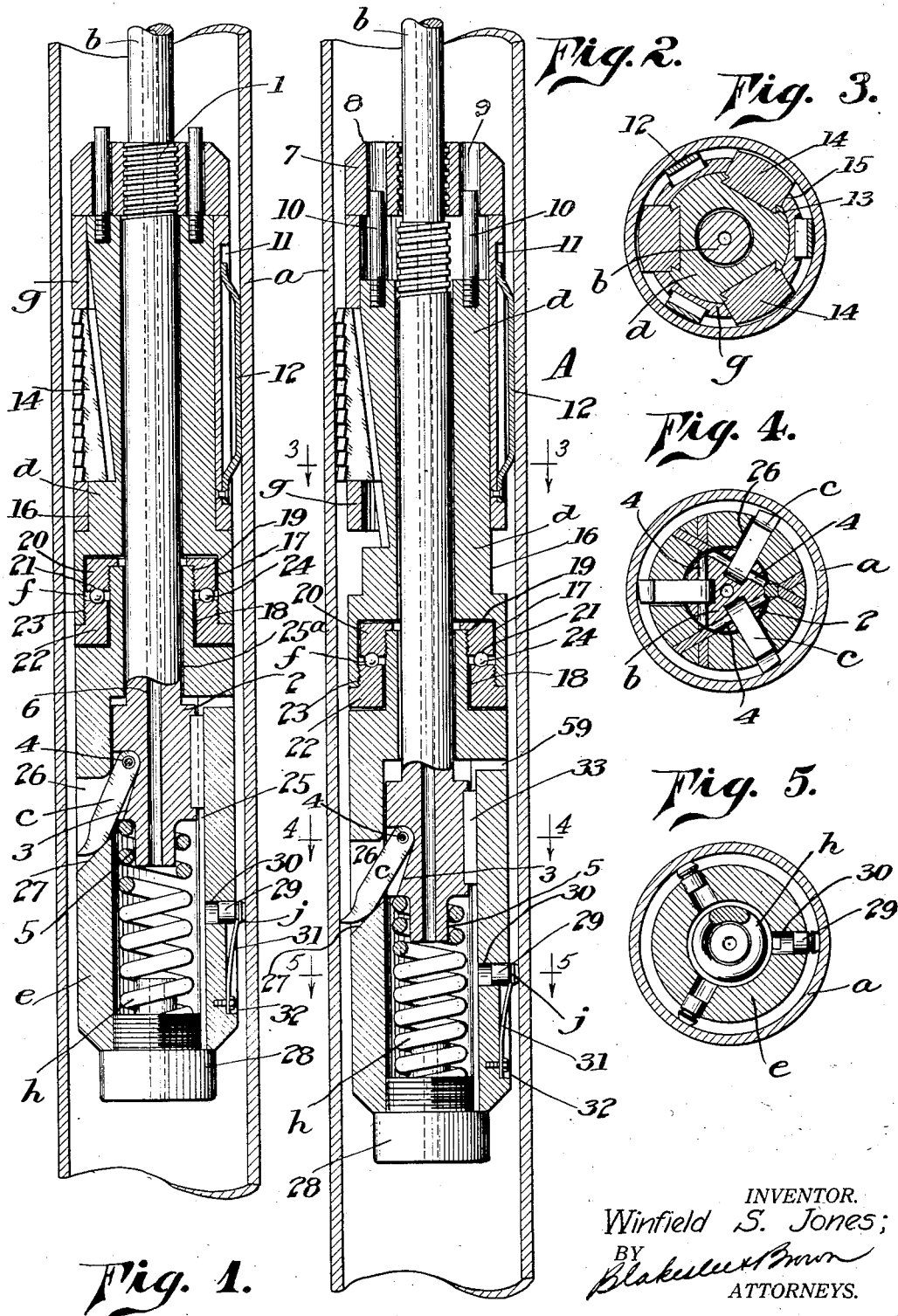

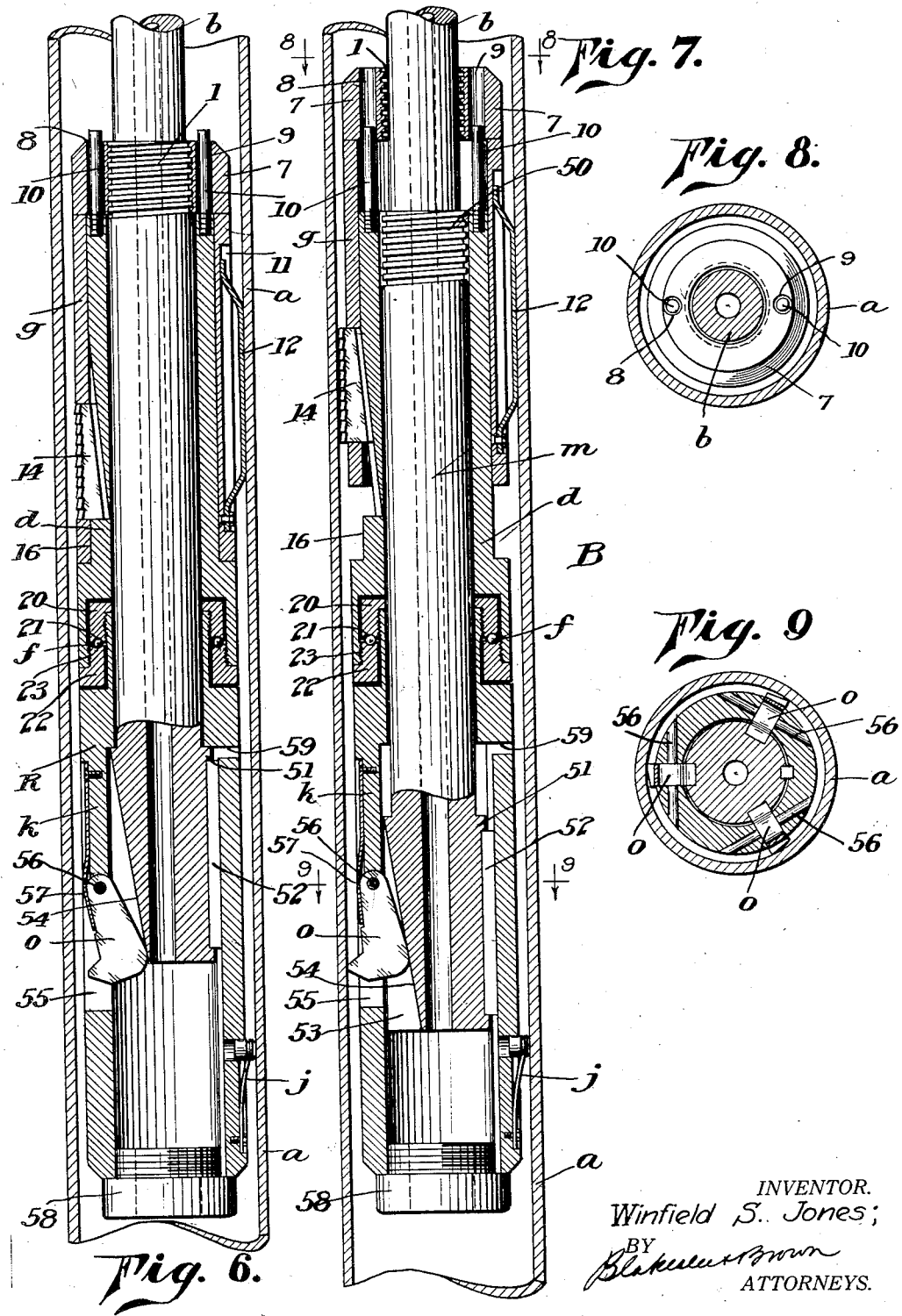

1,847,613

UNITED STATES PATENT OFFICE.

WINFIELD S. JONES, OF LONG BEACH, CALIFORNIA, ASSIGNOR, BY DIRECT AND MESNE ASSIGNMENTS, TO KAMMERER CORPORATION, OF SANTA FE SPRINGS, CALIFORNIA, A CORPORATION OF CALIFORNIA

CUTTER

Application filed September 23, 1927. Serial No. 221,488.

This invention relates to cutters of the character which are used for cutting pipe. Particularly the cutter about to be described is of the inside downward feeding type in that the said cutter is adapted to be received within the casing or tubing that is to be cut, and the cutters are to be actuated so as to engage the tubing, casing or the like upon downward actuation of certain members of the cutter. A feature of the present device resides in the fact that it is readily removable from the casing which has been cut and without in any manner damaging the tool.

The invention has for an object the provision of a cutter which is novel in construction, positive in its operation and with parts not liable to get out of order. With the above and other objects in view, the invention consists in the novel and useful provision, formation, construction, association and relative arrangement of parts, members and features all as shown in certain embodiments in the accompanying drawings, described generally, and more particularly pointed out in the claims.

In the drawings:

Fig. 1 is a vertical section of one form of my cutter;

Fig. 2 is a view similar to Figure 1 with certain of the parts of the cutter in changed relation;

Fig. 3 is a sectional view on the line 3—3 of Fig. 2;

Fig. 4 is a sectional view on the line 4—4 of Fig. 2;

Fig. 5 is a sectional view on the line 5—5 of Fig. 2;

Fig. 6 is a vertical sectional view of a modified form of cutter;

Fig. 7 is a view similar to Fig. 6, certain of the parts being in changed relation;

Fig. 8 is a sectional view on line 8—8 of Fig. 7; and

Fig. 9 is a cross-sectional view on line 9—9 of Fig. 7.

Corresponding parts in all the figures are designated by the same reference characters.

Referring now with particularity to the drawings, the improved cutter shown in Figs. 1 to 5 inclusive is designated as an entirety by A, and the form of the cutter shown in the remaining figures is designated as B. Where possible like reference characters will apply to the devices A and B, the device A being described first. The device A is shown within a casing or tubing $a$, which is to be cut and said device A is lowered within the said tubing or casing through the medium of rods, not shown. These rods are associated through the medium of a coupling with a mandrel $b$, which mandrel is provided at a zone thereof with screw threads 1 and the said mandrel is provided with a head 2 which in the present instance is of greater diameter than the main body of the mandrel. This head is adapted to carry cutter blades $c$, which cutter blades are in part recessed at 3 within the head, and pivotedly secured through the medium of pins or the like 4 to said head. This construction is detailed in Fig. 4. It is to be noted that one wall bounding the said recess 3 is inclined relatively to the axis of the head whereby the blade normally lies in part outside of said head. The said head is provided with a portion of reduced diameter 5. Furthermore it will be noted that the mandrel taken as an entirety is centrally bored at 6. The mandrel and head are adapted to be received within sleeves $d$ and $e$, and the said sleeves are rotatively coupled by means $f$, a sleeve $g$ in part surrounds the sleeve $d$.

As before stated, the mandrel $b$ is screw threaded at 1 and adapted to have screw threaded engagement with a collar 7 secured to the sleeve $g$. This collar is bored at 8 and 9 to receive guide pins 10 secured to the sleeve $d$. The sleeve $d$ is termed the slip operating sleeve and the sleeve $g$ the friction carrier sleeve. In this regard it will be noted that the sleeve $g$ is peripherally recessed at one or more zones, designated as 11, to receive one or more bowed friction springs 12 and that said sleeve $d$ is formed with peripheral dovetailed recesses 13, which receive correspondingly dovetailed slips 14. This construction is illustrated in Fig. 3. Furthermore these dovetailed recesses are at an angle to the axis of the sleeve $d$, which is to say, movement of the slip or slips in one direction causes the slip to move outwardly relative to the periphery of the sleeve $g$. In this regard the sleeve $g$ is formed with one or more, depending on the number of slips, slots 15 within which said slip or slips is or are received and the length of said slots, in the present instance, is slightly greater than the length or height of the slips as shown in Figs. 1 and 2. However, the dovetailed slots in the sleeve $d$ are of greater length so that when relative movement has occurred between the sleeves $d$ and $g$, which action will be detailed later, the slip or slips will move inwardly and outwardly of the slot in the sleeve $g$. The sleeve $d$ is reduced in diameter at 16 in order to shoulder the lower end portion of the sleeve $g$ and so that when the various elements of the cutter are in the position shown in Fig. 1, there will be a flush periphery between the several outside sleeves.

The sleeve $d$ is enlarged in diameter and recessed as shown at 17. The means $f$ is secured to the sleeve $d$ and in part received within the recess 17. The sleeve $e$ at one end thereof is reduced in diameter at 18 and screw threaded at 19. This portion of reduced diameter is likewise secured to the means $f$. This means in the present instance includes an annulus 20 screw threaded to the threads 19 and which annulus is provided with an annular ball race 21. An annulus 22 is screw threaded at 23 to the sleeve $d$ and this annulus is likewise formed with a ball race. Between the ball races of the said members 20 and 22 are placed rollers, balls, or the like, 24. It will be noted that the inner surface of the annulus 22 is spaced from the periphery of the portion of reduced diameter 18 of the sleeve $e$.

The sleeve $e$ is substantially an annulus, one bore 25 being of greater diameter than the bore 25a, and the head 2 of the mandrel is within the bore 25. The sleeve $e$ is provided with one or more transverse recesses 26, one wall of which, 27, is inclined, and this inclined wall is adapted to act as a cam medium for the blades $c$. In this regard it will be noted that when the several parts of the cutter are in the position shown in Fig. 1, that the said cutter has a portion thereof resting upon said inclined surface 27 with the said cutter in part totally confined within said recess. This cutter is so maintained through the medium of means $h$ comprising a coil spring which normally urges the mandrel upwardly so that the mandrel may have a screw threaded engagement with the collar 7. However, when the mandrel is disconnected from the collar 7, downward movement of the mandrel to compress the means $h$ will force the cutter outwardly beyond the periphery of the sleeve $e$ as shown in Fig. 2. To this end the lower end of the sleeve is adapted to receive an annular nut 28. The means $h$ bears against this annular nut. Furthermore means $j$ acts to center the sleeve $e$ when the same is within tubing or casing $a$. This means includes one or more cylindrical buttons 29, confined in part within transverse bores 30 in the sleeve $e$ and which buttons are normally urged outwardly from said bores through the medium of leaf springs or the like 31. That is, the leaf springs are recessed within the sleeve as shown at 32. The operation of the device just described is as follows: Having lowered the cutter as an entirety within the tubing $a$ to be cut, the mandrel $b$ may be unscrewed from the collar 7 due to the fact that the springs 12 tend to frictionally engage the inner surface of the tubing or casing. The mandrel may be then lowered and the slips 14 be projected outwardly so as to grasp the casing due to the fact that the sleeve $d$ will tend to drop downwardly relative to the sleeve $g$ when the mandrel is released from the collar. This downward movement will likewise cause the cutter to engage the inner surface of the tubing or casing. Upon turning the mandrel through the medium of the rotary table and associated tubing, the cutter blade or blades will commence the cutting action of the casing, the mandrel being slowly lowered to push the cutter outwardly during such cutting operation. The mandrel and the sleeve $e$ will rotate together due to the fact they are keyed as shown at 33. The sleeves $d$ and $g$ will not rotate due to the rotary sleeve connector $f$. After the cutting operation has been completed upward movement of the mandrel will collapse the cutter blades and the entire cutter may be withdrawn or removed to another zone of the casing for cutting operation. It will thus be seen that this cutter may be readily withdrawn from the casing in case of any collapse of the casing or for any other reason. This cutter is not adapted to lift the casing which has been severed, from the well hole, but said cutter is allowed to have free movement within the casing when the blade is out of engagement therewith.

The form of the cutter designated as B, operates upon the same general plan as the cutter A, and the parts above the rotary sleeve connector $f$ are identical in construction with the cutter just described. However, the sleeve below the rotary sleeve connection is differently constructed. For this reason all parts above the sleeve connector will be given the same reference characters as given the cutter A. The sleeve connector $f$ joins the sleeve $d$ with a sleeve $k$. Through said sleeves $d$ and $k$ is passed a mandrel $m$. The periphery of said mandrel at one zone thereof is formed with screw threads 50 for engagement with the screw threads of the collar 7. The mandrel head 51 is keyed at 52 to the sleeve $k$ and said mandrel head is formed with one or more recesses 53, a wall 54 of which is inclined or at an angle to the longitudinal axis of said mandrel. This wall 54 acts as a cam member for cutter blades $o$, which cutter blades are in part confined within a transverse recess 55 in the sleeve $k$, the cutter being pivotally secured by means 56 to said sleeve. Leaf springs or the like 57 are carried by the sleeve $k$ and engage the cutter blades $o$ to normally hold the same within the transverse slots 55 of the sleeve and in engagement with the wall or walls 54 of the mandrel head. An annular nut 58 is secured to the end of the sleeve $k$. The centering means $j$ is likewise provided for this sleeve. Both the cutters A and B are provided with relief ports 59 above the mandrel head.

The operation of the cutter B is as follows: When the mandrel is released from the collar 7, the mandrel will move downward within the sleeve $k$ and the cam surface, namely the wall or walls 54, will engage the cutters $o$ and force the same into engagement with casing $a$. Thus it will be noted that in the case of the cutter A the sleeve is formed with the cam surface for forcing the cutter out, the said cutter or cutters being associated with the mandrel, whereas in the case of the cutter B, the sleeve carries the cutter or cutters and the mandrel is formed with the cam surface or surfaces for moving the cutters. The principle of operation of the devices is, therefore, the same.

It is obvious that various changes, modifications, and variations may be made in practicing the invention in departure from the particular showing of the drawings without departing from the true spirit thereof.

Having thus disclosed my invention, I claim and desire to obtain by Letters Patent:

1. A cutter for oil well tubing and the like comprising first and second annular sleeves directly coupled together and held in axial alignment, a mandrel received within said sleeves, a means releasable by rotation of the mandrel for connecting the first sleeve with said mandrel, said second sleeve being formed with a slot, means operably connecting the second sleeve with the mandrel for simultaneous rotation thereof, a cutter blade, means whereby movement of the mandrel in one direction moves said cutter blade outwardly from said slot for tubing engagement, and means normally maintaining said cutter blade out of engagement with said tubing.

2. A cutter for oil well tubing and the like comprising first and second annular sleeves, a mandrel passed through said sleeves, means independent of said mandrel for rotatably coupling said first and second annular sleeves together, a means securing the first sleeve to the mandrel, said means operable to release the first sleeve by rotation of the mandrel, a means operably connecting the second sleeve with the mandrel for simultaneous rotation thereof, a cutter blade, means operable by relative movement between the second sleeve and the mandrel upon releasing the mandrel from the first sleeve to project the cutter blade, and a means for holding the first sleeve against rotation while the mandrel is being rotated.

3. A cutter for oil well tubing and the like comprising a pair of sleeves, a mandrel passing through the sleeves, means independent of said mandrel for rotatably coupling said sleeves together, co-operating means between the mandrel and one of the sleeves connecting the mandrel thereto, said means operable to release the mandrel from said sleeve upon rotation of the mandrel, a cutter, means operable by relative longitudinal movement between the mandrel and the other sleeve to project the cutter into engagement with the tubing that is to be cut, and a means for holding the first sleeve against rotation while the mandrel is being rotated.

4. A cutter for oil well tubing and the like comprising two hollow members, a mandrel extending through said members, means independent of said mandrel for rotatably connecting said members together, one of said members provided with screw threads, the mandrel provided with screw threads releasably engaging the first mentioned screw threads, a means adapted to frictionally engage the tubing that is to be cut to hold the first mentioned member against rotation when the mandrel is turned to unscrew it, a cutter, and means operable by relative longitudinal movement between the other sleeve and the mandrel to move the cutter into cutting position.

5. A cutter for oil well tubing and the like comprising a pair of sleeves, a mandrel extending through the sleeves, means independent of said mandrel for rotatably connecting said sleeves together, a screw threaded connection between the mandrel and one of the sleeves, a means on the first mentioned sleeve to frictionally engage the tubing that is to be cut, and a cutter carried by the mandrel, and means on the other sleeve operating to move the cutter into cutting position by relative longitudinal movement between the mandrel and the second mentioned sleeve.

6. A cutter for oil well tubing and the like comprising a pair of sleeves, a mandrel extending through said sleeves, means independent of said mandrel for rotatably coupling said sleeves together, a screw threaded connection between one of the sleeves and the mandrel, a means on the first mentioned sleeve to frictionally engage the tubing that is to be cut, a means connecting the mandrel and the other sleeve for simultaneous rotation thereof, means on the second mentioned sleeve to yieldingly engage the tubing that is to be cut to center said second mentioned sleeve, a cutter, and a means operable by relative longitudinal movement between the mandrel and the second mentioned sleeve to move the cutter into cutting position.

7. A cutter for oil well tubing and the like comprising rotatably coupled sleeves, a collar provided with screw threads, a mandrel extending through the sleeves and provided with screw threads to engage the first mentioned screw threads, a means preventing relative rotation between the collar and one of the sleeves, and permitting relative endwise movement therebetween, a means on the first mentioned sleeve to frictionally engage the tubing that is to be cut, a means connecting the mandrel with the other sleeve to prevent relative rotation therebetween and to admit of relative endwise movement therebetween, a cutter, and a means operable by relative endwise movement between the mandrel and the second mentioned sleeve to move the cutter into cutting position.

8. A cutter for oil well tubing and the like comprising rotatably coupled sleeves, a collar provided with screw threads, a mandrel extending through the sleeves and provided with screw threads to engage the first mentioned screw threads, a means preventing relative rotation between the collar and one of the sleeves, and permitting relative endwise movement therebetween, a means on the first mentioned sleeve to frictionally engage the tubing that is to be cut, a means connecting the mandrel with the other sleeve to prevent relative rotation therebetween and to admit of relative endwise movement therebetween, a cutter, a means operable by endwise movement of the mandrel in one direction to move the cutter into cutting position, and a spring tending to move said mandrel in the opposite direction.

9. A cutter for oil well tubing and the like comprising rotatably coupled sleeves, a third sleeve, a screw threaded member secured to the third sleeve, a mandrel extending through the sleeves and provided with screw threads to engage the first mentioned screw threads, a means slidably connecting the third sleeve to one of the first mentioned sleeves and preventing relative rotation therebetween, a means on the first mentioned sleeve to frictionally engage the tubing that is to be cut, a means connecting the mandrel with the remaining sleeve to prevent relative rotation thereof and to permit relative endwise movement therebetween, a cutter, and means operable by endwise movement between the mandrel and said remaining sleeve to move the cutter into cutting position.

10. A cutter for oil well tubing and the like comprising rotatably coupled sleeves, a third sleeve, a screw threaded member secured to the third sleeve, a mandrel extending through the sleeves and provided with screw threads to engage the first mentioned screw threads, a means slidably connecting the third sleeve to one of the first mentioned sleeves and preventing relative rotation therebetween, a means on the first mentioned sleeve to frictionally engage the tubing that is to be cut, a means connecting the mandrel with the remaining sleeve to prevent relative rotation thereof and to permit relative endwise movement therebetween, a cutter, a means operable by movement of the mandrel in one direction to move the cutter into cutting position, and a spring in said remaining sleeve tending to move the mandrel in the opposite direction.

11. A cutter for oil well tubing and the like comprising a pair of sleeves, a mandrel extending through said sleeves, means independent of said mandrel for rotatably coupling said sleeves together, a means connecting the mandrel to one of the sleeves and disengaging the same by rotation of the mandrel, a means on one of said sleeves to frictionally engage the tubing that is to be cut, a cutter pivoted to the mandrel, and a cam face on the other sleeve engageable with the cutter to move said cutter into cutting position upon endwise movement of the mandrel in one direction.

12. A cutter for oil well tubing and the like comprising first and second annular sleeves in axial alignment, means for holding the first sleeve against rotation, a mandrel extending from within one sleeve into the other, means independent of said mandrel for rotatably coupling said sleeves together, means releasably connecting the first sleeve with the mandrel, means operably connecting the second sleeve with the mandrel for simultaneous rotation thereof, a cutter blade, and means operable by the mandrel when the mandrel is released to project the cutter blade.

13. A cutter for oil well tubing and the like comprising first and second annular sleeves in axial alignment, a mandrel extending from within one sleeve into the other, means independent of said mandrel for rotatably coupling said sleeves together, means releasably connecting the first sleeve with the mandrel, means operably connecting the second sleeve with the mandrel for simultaneous rotation thereof, a cutter blade, means operable by the mandrel when the mandrel is released to project the cutter blade, and means associated with the first sleeve for positively engaging the tubing to maintain the first sleeve in a given position within the tubing.

14. A cutter for oil well tubing and the like comprising first and second annular sleeves in axial alignment, a mandrel extending from within one sleeve into the other, means independent of said mandrel for rotatably coupling said sleeves together, means releasably connecting the first sleeve with the mandrel, means operably connecting the second sleeve with the mandrel for simultaneous rotation thereof, a cutter blade, means operable by the mandrel when the mandrel is released to project the cutter blade, and means for centering the second sleeve within the tubing.

In testimony whereof, I have signed my name to this specification.

WINFIELD S. JONES.